United States Patent
Weigl et al.

(10) Patent No.: US 8,019,493 B1
(45) Date of Patent: Sep. 13, 2011

(54) SPACECRAFT THRUSTER TORQUE FEEDFORWARD CALIBRATION SYSTEM

(75) Inventors: Harald J. Weigl, Doylestown, PA (US); Neil E. Goodzeit, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1171 days.

(21) Appl. No.: 11/878,029

(22) Filed: Jul. 20, 2007

(51) Int. Cl.
*B64G 1/00* (2006.01)
(52) U.S. Cl. .......................................................... 701/13
(58) Field of Classification Search .......... 701/3, 13–14; 244/158.1, 164, 171, 171.1; 348/113, 117, 348/123
See application file for complete search history.

(56) References Cited

U.S. PATENT DOCUMENTS

| | | | | |
|---|---|---|---|---|
| 4,752,884 A | * | 6/1988 | Slafer et al. | 701/13 |
| 4,758,957 A | * | 7/1988 | Hubert et al. | 701/13 |
| 5,222,023 A | * | 6/1993 | Liu et al. | 701/13 |
| 6,463,365 B1 | * | 10/2002 | Anagnost et al. | 701/13 |
| 6,908,064 B2 | | 6/2005 | Goodzeit et al. | |
| 7,437,222 B2 | * | 10/2008 | Liu et al. | 701/3 |

OTHER PUBLICATIONS

Woodburn et al.; Estimation of Instantaneous Maneuvers Using a Fixed Interval Smoother; Advances in the Astronautical Sciences; 2004; pp. 243-260; vol. 116; Part I.
Carrico et al.; Maneuver Planning and Results for Clementine (The Deep Space Program Science Experiment); Paper No. AAS 95-129; AAS/AIAA Spaceflight Mechanics Meeting; Feb. 1995; pp. 477-499; Albuquerque, NM.
Skipper et al.; Autonomous Reconstruction and Calibration of GEO Stationkeeping Maneuvers; AIAA-2006-5590; SpaceOps 2006 Conference; Jun. 19-23, 2006; Rome, Italy.

* cited by examiner

*Primary Examiner* — Yonel Beaulieu
(74) *Attorney, Agent, or Firm* — McDermott Will & Emery LLP (57) ABSTRACT

A spacecraft includes a plurality of thrusters, a thruster firing logic, an actuator assembly, an attitude control system, and a torque calibration system. The plurality of thrusters is configured to apply torque to the spacecraft. The thruster firing logic is configured to control firing of the plurality of thrusters. The actuator assembly is configured to apply torque to the spacecraft. The attitude control system is configured to sense an attitude of the spacecraft and to provide an attitude control torque. The torque calibration system is configured to provide a thruster feedforward torque. A machine-readable medium includes instructions for a method for providing torque calibration to a spacecraft.

9 Claims, 6 Drawing Sheets

SPACECRAFT THRUSTER TORQUE FEEDFORWARD CALIBRATION SYSTEM

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of DG133E-05-CN-1166 awarded by the National Oceanic and Atmospheric Administration (NOAA).

FIELD OF THE INVENTION

The present invention generally relates to torque calibration systems and methods and, in particular, relates to spacecraft thruster torque feedforward calibration systems and methods.

BACKGROUND OF THE INVENTION

Future government and commercial spacecraft require higher accuracy payload pointing, increased maneuver fuel efficiency, and improved mission service continuity and data availability. To provide improved availability, future remote sensing spacecraft need to maintain accurate pointing and low jitter at all times, including during momentum adjust and stationkeeping maneuvers. In addition, next-generation communications spacecraft may have optical crosslinks and spot-beam antennas (e.g., phased array antennas) that require precision pointing and may include jitter sensitive components such as frequency generation units. These communications spacecraft need to maintain full performance during thruster maneuvers.

SUMMARY OF THE INVENTION

According to one aspect, a system of the present invention provides improved payload pointing performance by enabling high-accuracy feedforward cancellation of thruster disturbances using an actuator assembly such as reaction wheel assemblies (RWAs) during a momentum adjust or stationkeeping maneuver. The system can automatically calibrate the thruster sets that may be fired during a maneuver and eliminate attitude transients that may occur at the beginning or at any time during a maneuver when the selection of a thruster set for firing changes. A system of the present invention can, for example, reduce the peak attitude transient by roughly a factor of 10 (e.g., from 200 to 20 micro-rad).

In accordance with one aspect of the present invention, a spacecraft comprises a plurality of thrusters, a thruster firing logic, an actuator assembly, an attitude control system, and a torque calibration system. The plurality of thrusters is configured to apply torque to the spacecraft. The thruster firing logic is configured to control firing of the plurality of thrusters. The actuator assembly is configured to apply torque to the spacecraft. The attitude control system is configured to sense an attitude of the spacecraft and to provide an attitude control torque. The torque calibration system is configured to provide a thruster feedforward torque.

According to another aspect of the present invention, a torque calibration system for a spacecraft comprises a thruster torque error estimator and a thruster torque archive. The thruster torque error estimator is configured to receive thruster firing information and an attitude control torque and to provide thruster torque correction. The thruster torque archive is configured to receive thruster firing information and thruster torque correction, to store a thruster feedforward torque based on thruster torque correction, to select a thruster feedforward torque stored in the thruster torque archive based on thruster firing information, and to provide the selected thruster feedforward torque to apply torque to the spacecraft.

According to one aspect, the thruster torque error estimator operates to estimate the torque applied by each of the thruster sets as it is used during a maneuver. When the selection of a thruster set for firing changes, an actuator torque is applied using the latest thruster feedforward torque stored in the thruster torque archive. In addition, the thruster torque error estimator is re-initialized, and estimates the residual error in the actuator torque. At the end of a firing segment, the residual is used to update the thruster torque archive so that a more accurate thruster feedforward torque is available when the same thruster set is used again. The system tracks the torque variation for each of the thruster sets over life due to center of mass migration, propulsion pressure changes, and thruster performance variation due to use.

According to yet another aspect of the present invention, a machine-readable medium comprises instructions for a method for providing torque calibration to a spacecraft. The spacecraft comprises a plurality of thrusters. Each of a plurality of thruster sets comprises one or more of the plurality of thrusters. The method comprises: receiving first thruster firing information indicating that a first one of the plurality of thruster sets is fired; estimating first thruster torque correction for the first one of the plurality of thruster sets; storing a first thruster feedforward torque for the first one of the plurality of thruster sets based on the first thruster torque correction; and providing the first thruster feedforward torque upon receiving second thruster firing information indicating that the first one of the plurality of thruster sets is fired for a second time.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Various aspects of a system of the present invention are illustrated by way of example, and not by way of limitation, in the accompanying drawings, wherein.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail to avoid obscuring concepts of the present invention.

In accordance with one aspect, to provide the necessary maneuver performance, a system of the present invention may use an actuator assembly such as reaction wheel assemblies (RWAs) for attitude control and fire thrusters such as low thrust reaction engine assemblies (LTRs) for momentum adjust. In contrast to some other systems, which pulse thrusters at high frequency and low duty cycle (e.g., 6 second pulse interval, 5% duty cycle), a system of the present invention may use long-duration (nearly continuous) thruster firings from 30 seconds up to 5 minutes to adjust momentum. Different LTR sets are fired in sequence, such that a typical momentum adjust is completed in 15 to 20 minutes. The firing sequences can be determined, for example, in accordance with U.S. Pat. No. 6,908,064, entitled High-Efficiency REA Optimized Stationkeeping, which is hereby incorporated by reference in its entirety. The approach described in the aforementioned patent may be used to execute momentum adjust or Delta-V maneuvers that involve continuous firing of thrusters such as Arcjets. During the LTR (and Arcjet) firings, an actuator torque is applied using an actuator assembly to cancel the thruster torque to maintain precision attitude control.

One advantage of this approach (in addition to others such as improved orbit determination and jitter performance) according to one aspect of the present invention is that fuel consumption is reduced by more than 25% because the near-continuous LTR firing results in a high specific impulse (205 seconds). In contrast, using the standard low-duty-cycle firing approach results in a specific impulse of about 150 seconds. The benefit of reduced fuel consumption is the ability to increase the payload mass delivered to orbit on a given launch vehicle. For an exemplary spacecraft, the increased fuel efficiency increases payload mass to orbit, for example, by 78 kg. The disadvantage of the continuous-firing approach is that the thruster torques, which may be ten times higher than the average torque using a low-duty-cycle firing approach, need to be precisely canceled by the torques applied by the actuator assembly to maintain acceptable attitude pointing performance.

Unfortunately, precision thruster torque feedforward cancellation is difficult because the thruster torque varies over the mission, as the spacecraft center of mass moves as fuel is consumed, the propulsion system pressure changes, and thruster performance changes over life due to other factors. In addition, the initial thruster torque estimates are uncertain due to location as well as alignment uncertainty. Similarly, the actuator assembly that is used to apply the actuator torque has torque uncertainties due to misalignment and rotor inertia uncertainties. The torque error that results from these uncertainties causes an undesired attitude transient every time a different LTR set is fired during a momentum adjust or Delta-V maneuver.

One approach to solve the issues described above is to calibrate thruster torques individually using a tedious process of firing each thruster and determining the torque from the observed change in the system momentum. The large attitude transients caused by these calibration firings typically interrupt mission operations. The calibrations also need to be repeated periodically since the torque uncertainties change during a mission. Another approach is to estimate a single per-axis torque bias value for each maneuver, which is applied for the next maneuver to reduce the initial maneuver (start-up) transient. This approach is based on the assumption that the thruster disturbance torque is constant during a maneuver. This approach feeds forward a constant torque as determined from the observed error from a previous maneuver. While applying the constant bias torque reduces the attitude transient at the beginning of a maneuver, it does not reduce the large attitude transients as different thruster sets are subsequently turned on and off. These approaches do not reduce attitude errors that occur when the selection of a thruster set changes during a maneuver.

In accordance with one aspect, a system of the present invention improves maneuver attitude control performance by automatically calibrating the three-axis thruster feedforward torque for each of the thruster sets as it is fired during a maneuver. According to one aspect, a torque calibration system of the present invention includes a thruster torque archive that stores the three-axis thruster feedforward torque for every thruster set that may be used for momentum adjust and stationkeeping maneuvers during a mission. The torque calibration system also includes a thruster torque error estimator that determines the error in the applied thruster feedforward torque for each of the thruster sets, while it is firing.

When the firing of a given thruster set is completed, the thruster feedforward torque for that set is updated in the thruster torque archive, so a more accurate thruster feedforward torque is available for the next firing of the thruster set. Whenever the active thruster set changes (e.g., one or more thrusters is turned on or off), the thruster feedforward torque for the new thruster set, as stored in the thruster torque archive, is used.

Unlike the approach described above that uses constant bias systems that only reduce the attitude transient at the start of a maneuver, according to one aspect, a system of the present invention improves spacecraft pointing performance every time a different thruster set is fired while a maneuver is in progress. The calibration is performed autonomously during standard maneuvers without interrupting mission operations and accurately tracks the variations in the thruster torque throughout the mission, eliminating the need for periodic ground calibrations.

Figure 1:
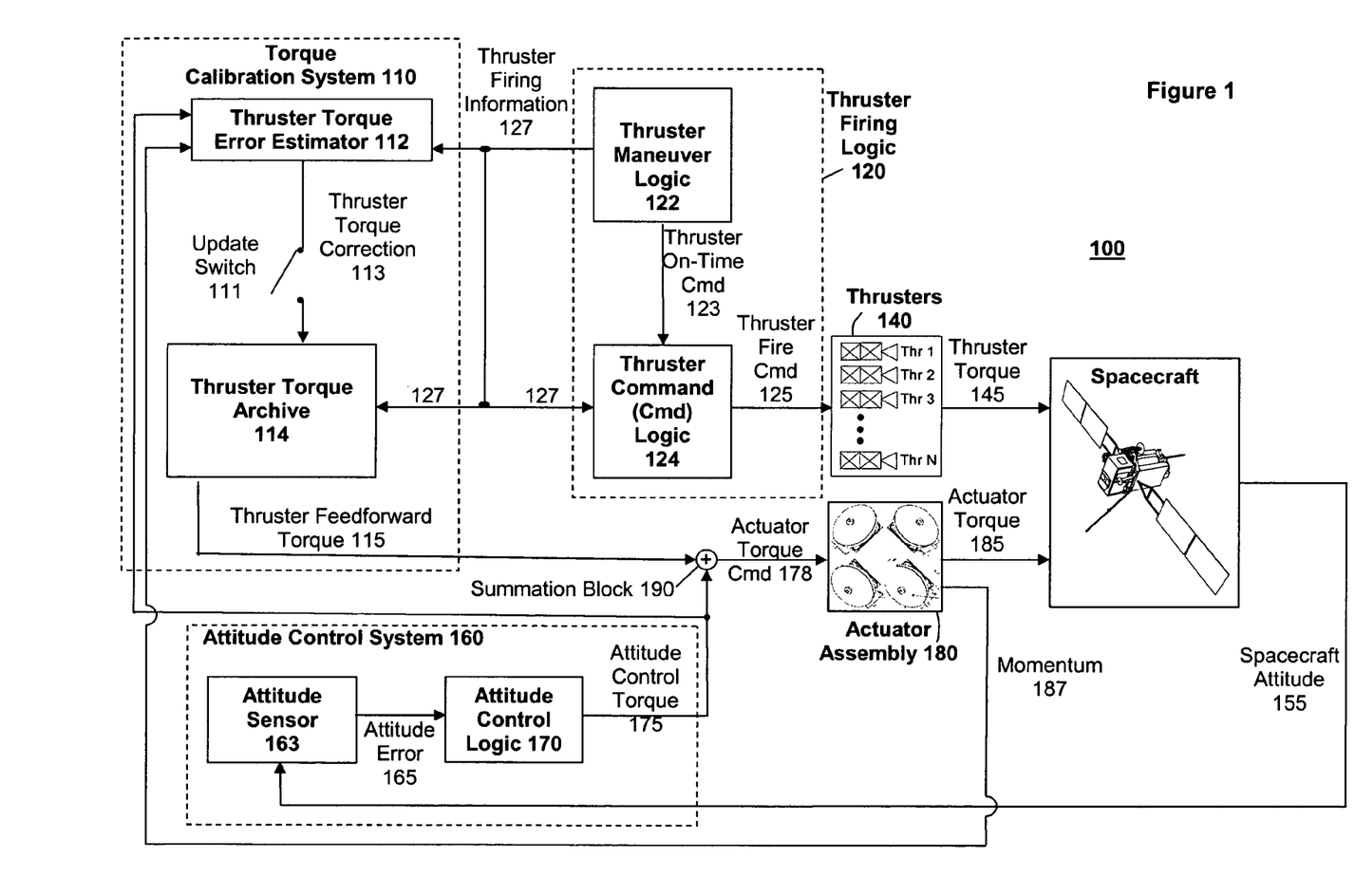
FIG. 1 is an exemplary block diagram of a system in accordance with one aspect of the present invention.

FIG. 1 is an exemplary block diagram of a system of the present invention in accordance with one aspect. A system 100 is a spacecraft and includes thrusters 140, a thruster firing logic 120, an attitude control system 160, a torque calibration system 110, a summation block 190, and an actuator assembly 180 such as reaction wheel assemblies (RWAs). The spacecraft can be a remote sensing satellite, and these types of spacecraft may have accurate pointing and low jitter requirements that need to be maintained at all times, including during maneuvers.

The thrusters 140 may apply thruster torque 145 to the spacecraft. The thrusters 140 may be arranged in a number of thruster sets, where each thruster set includes one or more thrusters. For example, the thrusters 140 may include N thrusters (e.g., thruster no. 1, thruster no. 2, thruster no. 3, through thruster no. N), and there may be M thruster sets (e.g., thruster set no. 1, thruster set no. 2, thruster set no. 3, through thruster set no. M), where N and M are positive integers. By way of example, and not by way of limitation, thruster set no. 1 may include thruster no. 1, thruster no. 3, and thruster no. 8. Thruster set no. 2 may include thruster no. 3, thruster no. 10, and thruster no. N. Thruster set no. 5 may include thruster no. 13 and thruster no. 15. Thruster set no. 7 may include thruster no. 5, thruster no. 8, thruster no. 9, and thruster no. 13. Thruster sets are not limited to these examples. A thruster set may include any number of thrusters, and different thruster sets may include one or more of the same thrusters and/or one or more of different thrusters. According to one aspect of the present invention, the thrusters are logically arranged in thruster sets rather than being physically arranged in sets. For example, the thrusters are logically arranged so that combinations of the thrusters can be fired to provide torque in different directions and provide total thrust in different directions.

A selected set of thrusters may be fired to impart a change in velocity (Delta-V) to the spacecraft, to change the momentum stored in the actuator assembly 180, or to perform both functions simultaneously. The exemplary configuration shown in FIG. 1 includes multiple thrusters on the spacecraft to apply torque independently along all three-body axes, and several different sets of thrusters can be fired during a maneuver. Another configuration may use a single thruster.

The thruster firing logic 120 is used during thruster operations and controls firing of the thrusters 140. The thruster firing logic 120 includes thruster maneuver logic 122 and thruster command logic 124. The thruster maneuver logic 122 determines thruster firing information 127, which includes, for example, information indicating which one of the thruster sets is selected for firing and when the selected one of the thruster sets is fired. The thruster maneuver logic 122 also produces a thruster on-time command 123. The thruster command logic 124 receives the thruster firing information 127 and the thruster on-time command 123. It then provides a thruster fire command 125 to the thrusters 140.

The attitude control system 160 includes an on-board attitude sensor 163 and attitude control logic 170. The attitude sensor 163 may include earth sensors, sun sensors, and/or star trackers to measure the spacecraft attitude and gyroscopes to measure spacecraft angular rate. The attitude sensor 163 senses the attitude of the spacecraft and produces an attitude error 165 of the spacecraft. In one aspect, the term attitude may refer to one or more attitudes, and it may refer to attitude(s) and rate(s).

The attitude control logic 170 receives the attitude error of the spacecraft and produces the attitude control torque 175. The error between the measured and desired spacecraft attitude is processed by the attitude control logic 170, which computes the attitude control torque 175 to null the attitude error. The attitude control torque 175 is applied to the spacecraft by the actuator assembly 180 to correct the control errors. According to one configuration, the actuator assembly 180 is a set of reaction wheel assemblies (RWAs). According to another configuration, the actuator assembly 180 may be control moment gyros (CMGs) or other actuators as known by those skilled in the art.

The torque calibration system 110 includes a thruster torque error estimator 112 and a thruster torque archive 114.

The thruster torque error estimator 112 receives the thruster firing information 127 and the attitude control torque 175 and produces thruster torque correction 113. The thruster torque error estimator 112 may also receive momentum 187 of the actuator assembly 180 so that the thruster torque correction 113 is generated based on the thruster firing information 127, the attitude control torque 175, and the momentum 187 of the actuator assembly 180. The momentum 187 may be speed information or momentum. The speed information may be used to compute momentum.

The thruster torque archive 114 receives the thruster firing information 127 and the thruster torque correction 113. It then stores a thruster feedforward torque based on the thruster torque correction 113. When a thruster set is selected for firing, the thruster torque archive 114 selects a thruster feedforward torque stored in the archive 114 based on the thruster set selection, and provides the selected thruster feedforward torque 115 to the actuator assembly 180 to apply a feedforward torque to the spacecraft. According to one aspect, a selected thruster feedforward torque may include one or more signals, and the thruster feedforward torque 115 and the attitude control torque 175 are signals representing 3-axis torque in the spacecraft body frame.

The summation block 190 combines the thruster feedforward torque 115 and the attitude control torque 175 and produces the actuator torque command 178, which is provided to the actuator assembly 180. The actuator assembly 180 applies an actuator torque 185 to the spacecraft. According to one aspect, all of the elements in FIG. 1 are on-board the spacecraft, and the torque calibration is performed in real-time. Alternatively, the torque calibration system 110 and/or the thruster firing logic 120 may be located separately from the spacecraft (e.g., on the ground).

According to one aspect of the present invention, a thruster feedforward torque may be updated as follows: for instance, when a selected set of thrusters (e.g., Thruster Set A) is fired, the thruster torque error estimator 112 can estimate a thruster torque correction 113 during the firing segment of the Thruster Set A. The thruster torque archive 114 can receive the thruster torque correction 113. At the end of the firing segment, the thruster torque archive 114 can determine a thruster feedforward torque for the Thruster Set A based on the thruster torque correction 113 and a thruster feedforward torque previously determined from the last firing of the Thruster Set A. This can be expressed as follows:

thruster feedforward torque (at the end of a present firing segment of a selected thruster set)= gain*thruster torque correction+thruster feedforward torque (obtained from the last firing segment of the selected thruster set), where gain can be 1, or any value smaller than 1 if some filtering is desired. A different gain can be applied for each axis.

According to one exemplary configuration, the thruster torque error estimator 112 may be configured to receive first thruster firing information 127 indicating that a first one of the thruster sets is fired, to receive a first attitude control torque 175 associated with firing of the first one of the thruster sets, and to receive first momentum 187 of the actuator assembly 180 associated with firing of the first one of the thruster sets. The thruster torque error estimator 112 may be further configured to estimate first thruster torque correction 113 associated with firing of the first one of the thruster sets based on the first thruster firing information 127, the first attitude control torque 175, and the first momentum 187 of the actuator assembly 180. The thruster torque archive 114 may be configured to receive the first thruster torque correction 113, to determine a first thruster feedforward torque based on the first thruster torque correction 113, and to store the first thruster feedforward torque. The thruster torque archive 114 may be also configured to provide the first thruster feedforward torque 115 upon receiving second thruster firing information 127 indicating that the first one of the thruster sets is fired for a second time subsequent to receiving the first thruster firing information 127.

In this exemplary configuration, the thruster torque error estimator 112 may be further configured to receive the second thruster firing information 127 indicating that the first one of the thruster sets is fired for the second time, to receive a second attitude control torque 175 associated with firing of the first one of the thruster sets for the second time, and to receive second momentum 187 of the actuator assembly 180 associated with firing of the first one of the thruster sets for the second time. The thruster torque error estimator 112 may be further configured to estimate second thruster torque correction 113 associated with firing of the first one of the thruster sets for the second time based on the second thruster firing information 127, the second attitude control torque 175, and the second momentum 187 of the actuator assembly 180. The thruster torque archive 114 may be further configured to receive the second thruster torque correction 113, and to determine a second thruster feedforward torque based on the second thruster torque correction 113 and the first thruster feedforward torque. The second thruster feedforward torque is used to update the thruster torque archive 114 so that a more accurate thruster feedforward torque is available when the first one of the thruster sets is fired again. The thruster torque archive 114 may be also configured to provide the second thruster feedforward torque 115 upon receiving third thruster firing information 127 indicating that the first one of the thruster sets is fired for a third time subsequent to receiving the second thruster firing information 127.

According to one aspect, to minimize attitude transients when thrusters are fired, equal and opposite torques are applied to the spacecraft by the actuator assembly 180 and the thrusters 140 so that there is no spacecraft rotation. This is implemented by feeding forward the expected thruster torque 115 to the actuator assembly 180. In practice, there may be significant uncertainty in the steady-state torque that is applied by the thrusters due to variations over life in the thruster performance and the spacecraft center of mass. Additionally, the thruster torque is not known precisely due to uncertainties in the thruster location and alignment. The actuator torque applied by the actuator assembly 180 is also subject to alignment and rotor inertia uncertainties. The combined effect of these torque errors may be as large as 5% to 10% of the total thruster torque resulting in unacceptable attitude transients for remote sensing and communications missions. According to one aspect, a system of the present invention calibrates the effect of these slowly varying uncertainties to improve the accuracy of the thruster feedforward torque for each of the thruster sets.

In addition to the slowly varying torque uncertainties, the thruster feedforward torque may also have an error due to turn-on and turn-off thrust transients at the beginning and end of a thruster firing. In one aspect, the torque calibration system 110 is tuned to ignore these transient errors as well as the effects of thruster torque noise. The torque calibration system 110 can significantly improve attitude control performance by calibrating the thruster feedforward torque errors while filtering out the effects of short-duration transients and noise. According to one aspect, because it is not possible to calibrate individual thrusters while multiple thrusters are firing, the torque calibration system 110 estimates and archives the total three-axis torque of each of the thruster sets, while it is being used.

In accordance with one aspect of the present invention, FIG. 1 shows how the thruster feedforward torque 115 from the thruster torque archive 114 is added to the attitude control torque 175. The thruster feedforward torque 115 is selected from the thruster torque archive 114 based on the thruster set selected for firing, as determined by the thruster maneuver logic 122. The selected thruster set is monitored by the torque calibration system 110 to detect when a new thruster set is to be fired. When the active thruster set changes, the thruster torque archive 114 is updated based on the thruster torque correction 113 previously estimated by the thruster torque error estimator 112. An update switch 111 may be used to allow the thruster torque correction 113 to be provided to the thruster torque archive 114 when a selected thruster set changes. The thruster torque error estimator 112 then resets the thruster torque correction to zero. The thruster torque error estimator 112 subsequently receives and filters the attitude control torque 175 to determine the thruster torque correction 113 for the new thruster set.

According to one aspect of the present invention, the thruster torque error estimator 112 is implemented as a constant gain observer. The thruster torque error estimator 112 is based on a simplified model that ignores spacecraft attitude dynamics. Any error in the thruster feedforward torque for the new thruster set results in attitude transients that may be corrected by the attitude control system 160 following the switch to the new thruster set. Once the new thruster set has been fired long enough, the attitude control torque 175 commanded to the actuator assembly 180 will be equal to the feedforward torque errors, which are the differences between the thruster torque 145 and the actuator torque 185, resulting in nearly zero attitude errors. The thruster torque error estimator 112 models these steady-state conditions, and its bandwidth is tuned to ignore the initial attitude transients and other short-duration transients and noise.

According to one aspect of the present invention, Equation 1 shows exemplary state equations for the thruster torque error estimator 112.

$$\dot{x} = Ax + Bu \qquad (1)$$

$$\begin{bmatrix} \dot{H}_{RWA}(x) \\ \dot{H}_{RWA}(y) \\ \dot{H}_{RWA}(z) \\ \dot{T}_{ERROR}(x) \\ \dot{T}_{ERROR}(y) \\ \dot{T}_{ERROR}(z) \end{bmatrix} = \begin{bmatrix} 0 & 0 & \Omega & 1 & 0 & 0 \\ 0 & 0 & 0 & 0 & 1 & 0 \\ -\Omega & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix} \begin{bmatrix} H_{RWA}(x) \\ H_{RWA}(y) \\ H_{RWA}(z) \\ T_{ERROR}(x) \\ T_{ERROR}(y) \\ T_{ERROR}(z) \end{bmatrix} +$$

$$\begin{bmatrix} 1 & 0 & 0 \\ 0 & 1 & 0 \\ 0 & 0 & 1 \\ 0 & 0 & 0 \\ 0 & 0 & 0 \\ 0 & 0 & 0 \end{bmatrix} \begin{bmatrix} T_{FEEDFORWARD}(x) \\ T_{FEEDFORWARD}(y) \\ T_{FEEDFORWARD}(z) \end{bmatrix}$$

The first three states are the three-axis momentum 187 of the actuator assembly 180 where x, y and z are the spacecraft roll, pitch, and yaw body axes respectively. In an exemplary configuration where the actuator assembly 180 includes reaction wheel assemblies (RWAs), momentum 187 is the three-axis RWA momentum. The three remaining states are the three-axis feedforward torque error components. Estimates of these torque error states are used to correct the thruster torque archive 114 when the thruster set changes during a maneuver as previously described. The state equations for the momentum 187 account for the gyroscopic coupling of a geosynchronous spacecraft between the roll and yaw axes due to the orbit rate about the pitch axis, Ω, as well as the assumption that the change in momentum 187 is due to the sum of the applied thruster feedforward torque and the unknown feedforward torque errors. Equation 1 models a feedforward torque error as a constant, which is consistent with the objective of estimating the steady-state feedforward torque errors.

The Equation 1 model is used as the basis for the observer shown in Equation 2, according to one aspect of the present invention. Methods for designing such observers given a system dynamics model are well known by those skilled in the art. According to one aspect of the present invention, the observer states are estimates of the momentum 187 and the feedforward torque errors from Equation 1. The A and B matrices in Equation 2 are defined in the state equations for the thruster torque error estimator 112 shown in Equation 1. The estimator state vector, $x_{ESTIMATE}$, is the estimate of the state vector, x, in Equation 1. The vector of measurements, $y_{MEASURE}$, applied to the filter is defined in Equation 3. The second input vector, u, consists of the three-axis feedforward torque error defined in Equation 1. The observer gain matrix, L, may be used to tune the bandwidth of the thruster torque error estimator 112 and can be derived using well-known methods such as optimal linear quadratic estimation.

$$\dot{x}_{ESTIMATE} = (A-L)x_{ESTIMATE} + Ly_{MEASURE} + Bu \quad (2)$$

The measurements used to update the observer in Equation 2 are shown in Equation 3 in accordance with one aspect of the present invention. The six measurements consist of the three-axis momentum components 187, $H_{RWA}$, of the actuator assembly 180 and the commanded three-axis attitude control torque 175, $T_{ATT\_CNTL}$.

$$y_{MEASURE} = \begin{bmatrix} H_{RWA}(x) \\ H_{RWA}(y) \\ H_{RWA}(z) \\ T_{ATT\_CNTRL}(x) \\ T_{ATT\_CNTRL}(y) \\ T_{ATT\_CNTRL}(z) \end{bmatrix} \quad (3)$$

The improved pointing performance produced by the torque calibration system 110 is illustrated by the simulation results shown in FIGS. 2 to 7 in accordance with one aspect of the present invention. The roll, pitch and yaw axis responses are denoted by letter "a" (dashed lines), letter "b" (solid lines) and letter "c" (dot-dash lines), respectively, following each numeric label in each plot (excluding the first plot in each figure) in FIGS. 2 to 7 (e.g., 222a, 222b, 222c through 252a, 252b, 252c in FIG. 2; 322a, 322b, 322c through 352a, 352b, 352c in FIG. 3; 422a, 422b, 422c through 452a, 452b, 452c in FIG. 4; 522a, 522b, 522c through 552a, 552b, 552c in FIG. 5; 622a, 622b, 622c through 652a, 652b, 652c in FIG. 6; and 722a, 722b, 722c through 752a, 752b, 752c in FIG. 7). Each plot in each figure (excluding the first plot in each figure) thus shows three-axis responses.

These figures show performance for six representative RWA momentum adjust maneuvers performed on six successive days. Roll and yaw RWA momentum is simulated to be adjusted daily and pitch RWA momentum is adjusted during every second maneuver. Different thruster sets are used throughout the various maneuvers. As the thruster feedforward torque is calibrated during each firing, the attitude transients are significantly reduced. The spacecraft is modeled as a rigid body for these examples so the improved jitter response that results using this system is not illustrated.

Figure 2:
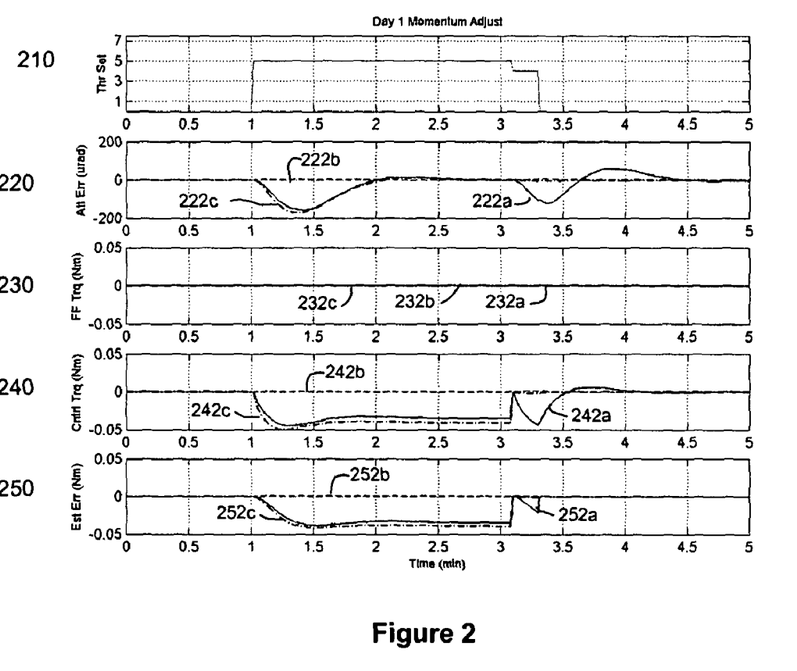
FIG. 2 illustrates a spacecraft maneuver calibration process for a first one of the six exemplary maneuvers in accordance with one aspect of the present invention.
Figure 3:
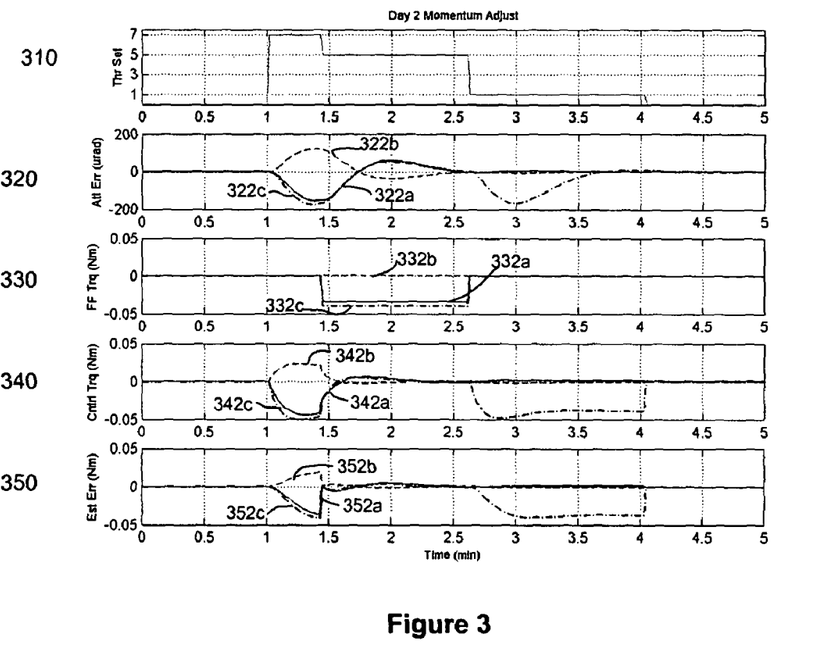
FIG. 3 illustrates a spacecraft maneuver calibration process for a second one of the six exemplary maneuvers in accordance with one aspect of the present invention.
Figure 4:
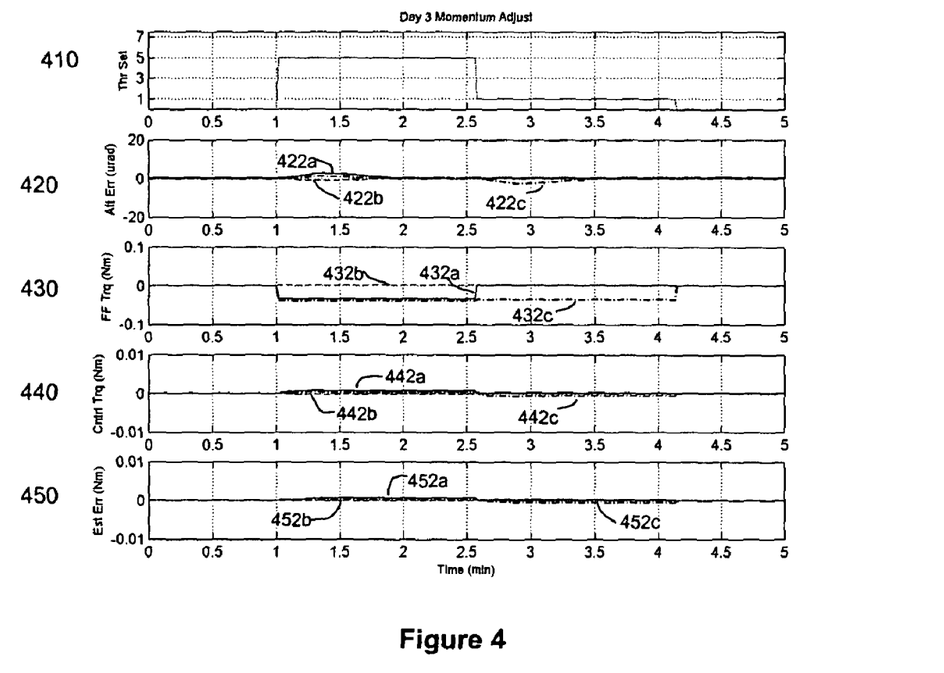
FIG. 4 illustrates a spacecraft maneuver calibration process for a third one of the six exemplary maneuvers in accordance with one aspect of the present invention.
Figure 5:
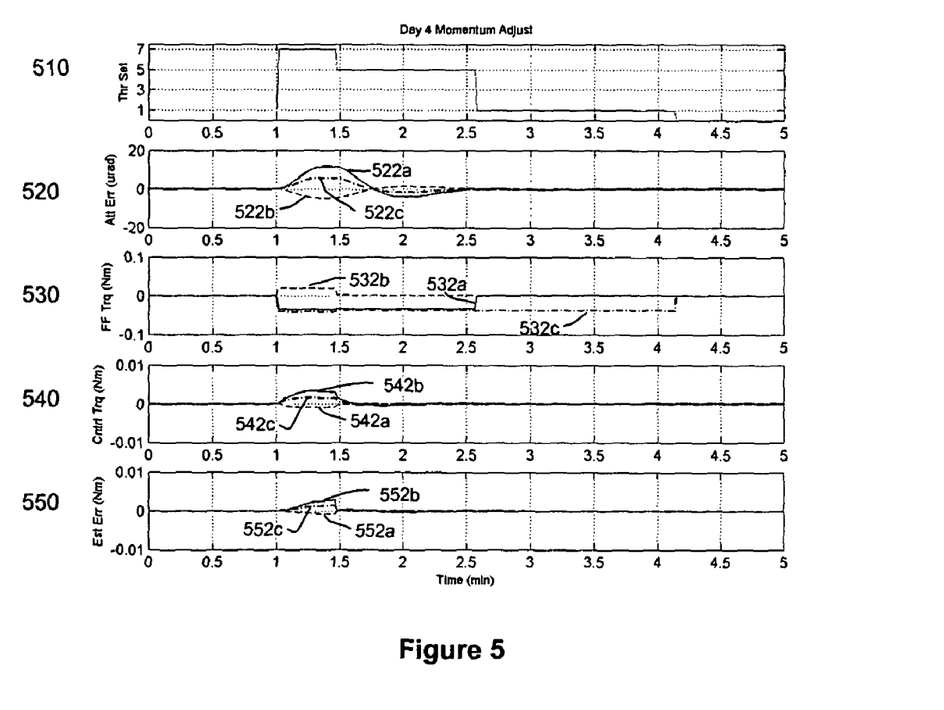
FIG. 5 illustrates a spacecraft maneuver calibration process for a fourth one of the six exemplary maneuvers in accordance with one aspect of the present invention.
Figure 6:
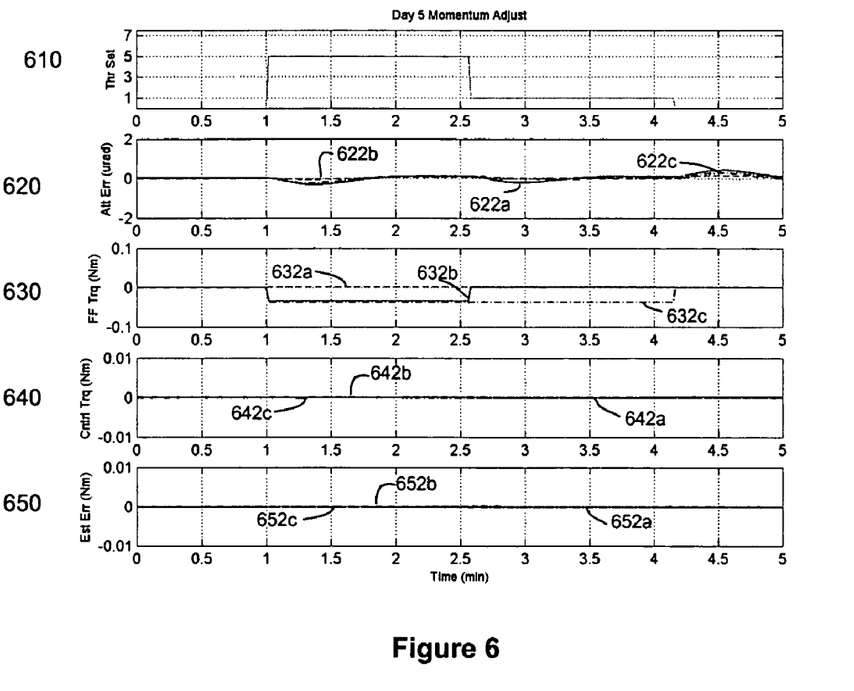
FIG. 6 illustrates a spacecraft maneuver calibration process for a fifth one of the six exemplary maneuvers in accordance with one aspect of the present invention.
Figure 7:
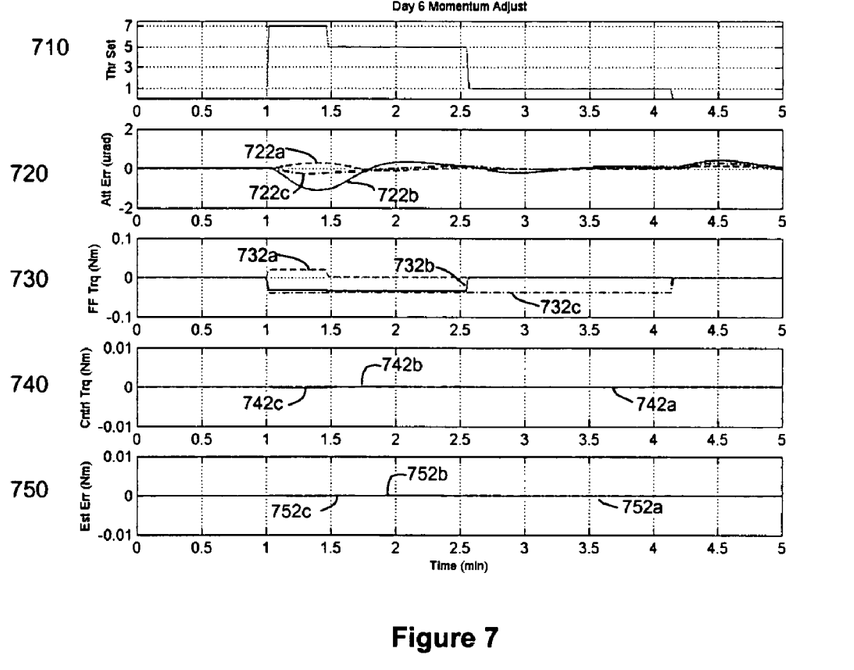
FIG. 7 illustrates a spacecraft maneuver calibration process for the last one of the six exemplary maneuvers in accordance with one aspect of the present invention.

FIG. 2 is for maneuver 1, FIG. 3 is for maneuver 2, FIG. 4 is for maneuver 3, FIG. 5 is for maneuver 4, FIG. 6 is for maneuver 5, and FIG. 7 is for maneuver 6. The first plot (e.g., 210, 310, 410, 510, 610, and 710) in each figure shows the thruster sets that are being fired as a function of time, and this information can be included in the thruster firing information 127 in FIG. 1. The second plot (e.g., 220, 320, 420, 520, 620, and 720) in each figure shows the attitude error 165 in FIG. 1. The third plot (e.g., 230, 330, 430, 530, 630, and 730) in each figure shows the thruster feedforward torque 115 in FIG. 1. The fourth plot (e.g., 240, 340, 440, 540, 640, and 740) in each figure shows the attitude control torque 175 in FIG. 1. The fifth plot (e.g., 250, 350, 450, 550, 650, and 750) in each figure shows the feedforward torque error estimated by the thruster torque error estimator 112.

Referring to the first plot 210 in FIG. 2, a thruster set value of zero indicates that no thrusters are being fired. In this example, the first maneuver starts at one minute by firing thruster set no. 5 for approximately 2 minutes followed by a shorter firing of thruster set no. 4. The second plot 220 shows the attitude transient magnitudes (denoted as 222a, 222b, and 222c for three-axes) up to 200 μrad when thruster set no. 5 starts to fire and again when the system switches to thruster set no. 4. The third plot 230 shows the applied thruster feedforward torque 115 (shown as 232a, 232b and 232c for three-axes), which is set to zero at the start of the six-maneuver simulation.

The attitude control torque 175 (shown as 242a, 242b and 242c for three-axes) in the fourth plot 240 shows how the commanded torque charges up to correct the mismatch between the thruster torque 145 and the actuator torque 185 (thereby driving the attitude error to zero). The last plot 250 shows how the thruster torque error estimator 112 begins to estimate the torque error (shown as 252a, 252b, and 252c for three-axes) for thruster set no. 5 based on the commanded attitude control torque 175. The estimated torque error is reset to zero when the selected thruster set is switched to thruster set no. 4. The thruster torque error estimator 112 then begins estimating the torque error for thruster set no. 4.

As shown in FIG. 3, for the momentum adjust during the second maneuver, thruster set nos. 7, 5 and 1 are used. The second plot 320 shows the attitude transient magnitudes (denoted as 322a, 322b, and 322c for three-axes) up to 200 μrad when thruster set no. 7 starts to fire and again when the system switches to thruster set no. 1. The attitude transient magnitudes for thruster set no. 5 are much less than 200 μrad because the torque calibration system 110 applies the corrected thruster feedforward torque 115 (shown as 332a, 332b and 332c for three-axes) when thruster set no. 5 is fired based on the calibration from the first maneuver (see FIG. 2). Although the spacecraft attitude is still responding to the disturbance from the previous firing of thruster set no. 7, it is clear that the thruster feedforward torque for thruster set no. 5 has reduced the attitude control torque (shown as 342a, 342b and 342c for three-axes) when the thruster set no. 5 is fired.

The last plot 350 shows how the thruster torque error estimator 112 begins to estimate the torque error (shown as 352a, 352b and 352c for three-axes) for thruster set no. 7 (a set that was not fired during the first maneuver) during the first segment, based on the commanded attitude control torque 175. The estimated torque error is reset to zero when the selected thruster set is switched to thruster set no. 5. The thruster torque error estimator 112 then estimates the torque error for thruster set no. 5 while it is fired, and then estimates the torque error for thruster set no. 1 while it is fired until the end of the maneuver. The estimated torque error is reset to zero when the thruster set switches from thruster set no. 5 to no. 1.

The benefit of the torque calibration system 110 is more evident during the third maneuver as shown in FIG. 4. Thruster set nos. 5 and 1 have been calibrated during the previous firings. Applying the calibrated thruster feedforward torque (shown as 432a, 432b, and 432c for three-axes in the third plot 430) results in attitude error transients well below 10 μrad (see 422a, 422b, and 422c in the second plot 420). As shown by the fourth and fifth plots 440 and 450, the system continues to generate attitude control torque (shown as 442a, 442b and 442c) and estimate the remaining uncalibrated torque error for these thruster sets (see 452a, 452b and 452c). Note that the scale on the vertical axes of the plots shown in FIGS. 4 through 7 has been reduced.

The fourth maneuver shown in FIG. 5 begins with the second use of thruster set no. 7. The initial attitude error (shown as 522a, 522b, and 522c) is reduced to less than 20 μrad by using the corrected thruster feedforward torque (shown as 532a, 532b, and 532c in the third plot 530 during the first segment) from the second maneuver. The attitude control torque (shown as 542a, 542b and 542c in the fourth plot 540 during the first segment is less than that of the second maneuver shown in FIG. 3. The thruster torque error estimator 112 continues to estimate the torque error in the thruster feedforward torque for thruster set no. 7 (see 552a, 552b, and 552c in the fifth plot 550 during the first segment). By this fourth maneuver, the torque errors for thruster set nos. 5 and 1 have been calibrated.

This is confirmed by the next maneuver shown in FIG. 6. The attitude error (shown as 622a, 622b and 622c in the second plot 620) with the corrected thruster feedforward torque (shown as 632a, 632b and 632c in the third plot 630) is less than 2 μrad for both thruster set nos. 5 and 1. The vertical axis scale of the second plot is further reduced in this figure and the next. FIG. 7 (shown for the last maneuver) confirms that the attitude errors (shown as 722a, 722b and 722c in the second plot 720) with the corrected thruster feedforward torque (shown as 732a, 732b and 732c in the third plot 730) are also below 2 μrad for the next firing of thruster set no. 7. As shown in FIGS. 6 and 7, the attitude control torque (shown as 642a, 642b, and 642c in FIG. 6 and 742a, 742b and 742c in FIG. 7) and the torque error (shown as 652a, 652b, and 652c in FIG. 6 and 752a, 752b and 752c in FIG. 7) are negligible.

In accordance with one aspect of the present invention, the simulation results demonstrate how the automatic torque calibration system 110 significantly reduces the attitude transient when each thruster set is fired. The steady-state torque errors from the thrusters 140 and the actuator assembly 180 (that vary between 7% and 9% of the total thruster torque on the three body axes) result in attitude transients as large as 200 μrad during the first two maneuvers. The torque calibration system 110 effectively calibrates these steady-state torque errors after 2 to 3 firings of a thruster set. The simulations do not include the effects of short duration feedforward torque errors (e.g., due to variation in thruster thrust rise time) that would be ignored (e.g., filtered out) by the torque calibration system 110. These effects have been modeled in other simulations, and the residual attitude transients (on the order of 20 μrad) are still well below the 200 μrad errors that would result for an uncalibrated system. It should be understood that while three-axis responses are described above, the present invention is not limited to three-axes or any number of axes.

According to one aspect, a system of the present invention can automatically calibrate the torque produced by any of the thruster sets and reduce the attitude transients that may occur when the selection of a thruster set for firing changes during a maneuver. In addition, the system can provide maneuver-pointing performance that is nearly indistinguishable from performance during normal (non-maneuver) operations. The term spacecraft used herein may refer to a space vehicle, an aircraft, a vehicle, or any other suitable system according to one aspect of the present invention.

Figure 8:
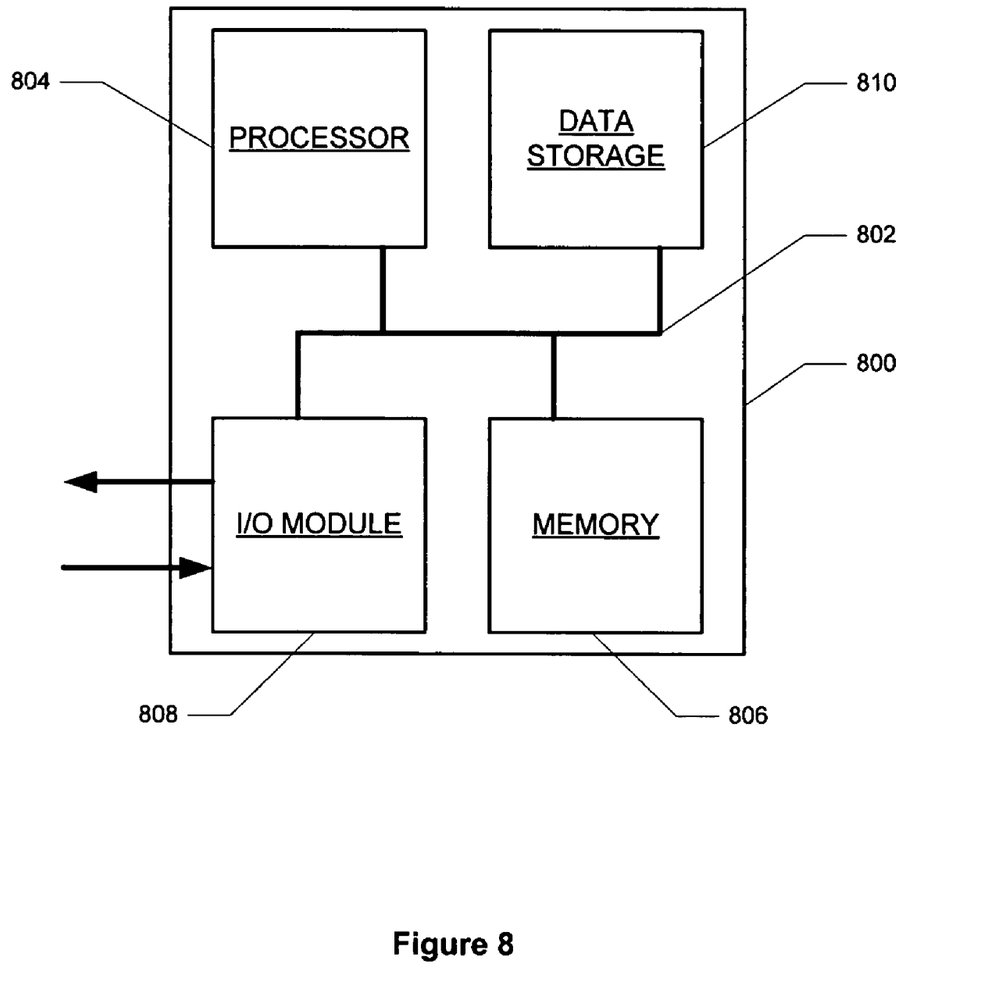
FIG. 8 is an exemplary block diagram that illustrates a computing system that can perform an aspect of the present invention.

FIG. 8 is an exemplary block diagram that illustrates a computing system 800 that can perform an aspect of the present invention. The computing system 800 may include a bus 802 or other communication mechanism for communicating information, and a processor 804 coupled with the bus 802 for processing information. The computing system 800 may also include a memory 806, such as a random access memory (RAM) or other dynamic storage device, coupled to bus 802 for storing information and instructions to be executed by the processor 804. The memory 806 may also be used for storing temporary variable or other intermediate information during execution of instructions to be executed by the processor 804. The computing system 800 may further include a data storage device 810, such as a magnetic disk or optical disk, coupled to the bus 802 for storing information and instructions.

The computing system 800 may also be coupled via an I/O module 808 to a display device (not illustrated), such as a cathode ray tube (CRT) or liquid crystal display (LCD) for displaying information to a user. An input device (not illustrated), such as, for example, a keyboard or a mouse may also be coupled to the computing system 800 via the I/O module 808 for communicating information and command selections to the processor 804.

A term "machine-readable medium" may refer to any medium that participates in providing instructions to a processor for execution. Such a medium may take many forms, including, but not limited to, one or more of a non-volatile medium, volatile medium, and transmission medium. Non-volatile media include, for example, optical or magnetic disks, such as the data storage device 810. Volatile media include, for example, dynamic memory, such as the memory 806. Transmission media include, for example, coaxial cables, copper wire, and fiber optics, including the wires that comprise the bus 802. Transmission media can also take the form of acoustic or light waves, such as those generated during radio frequency and infrared data communications. Common forms of a machine-readable medium include, for example, a floppy disk, a flexible disk, a hard disk, a magnetic tape, any other magnetic medium, a CD-ROM, a DVD, any other optical medium, a punch card, a paper tape, any other physical medium with patterns of holes, a RAM, a programmable read-only memory (PROM), an erasable PROM (EPROM), a FLASH EPROM, any other memory chip or cartridge, a carrier wave, or any other medium from which a computing device can read.

Figure 9:
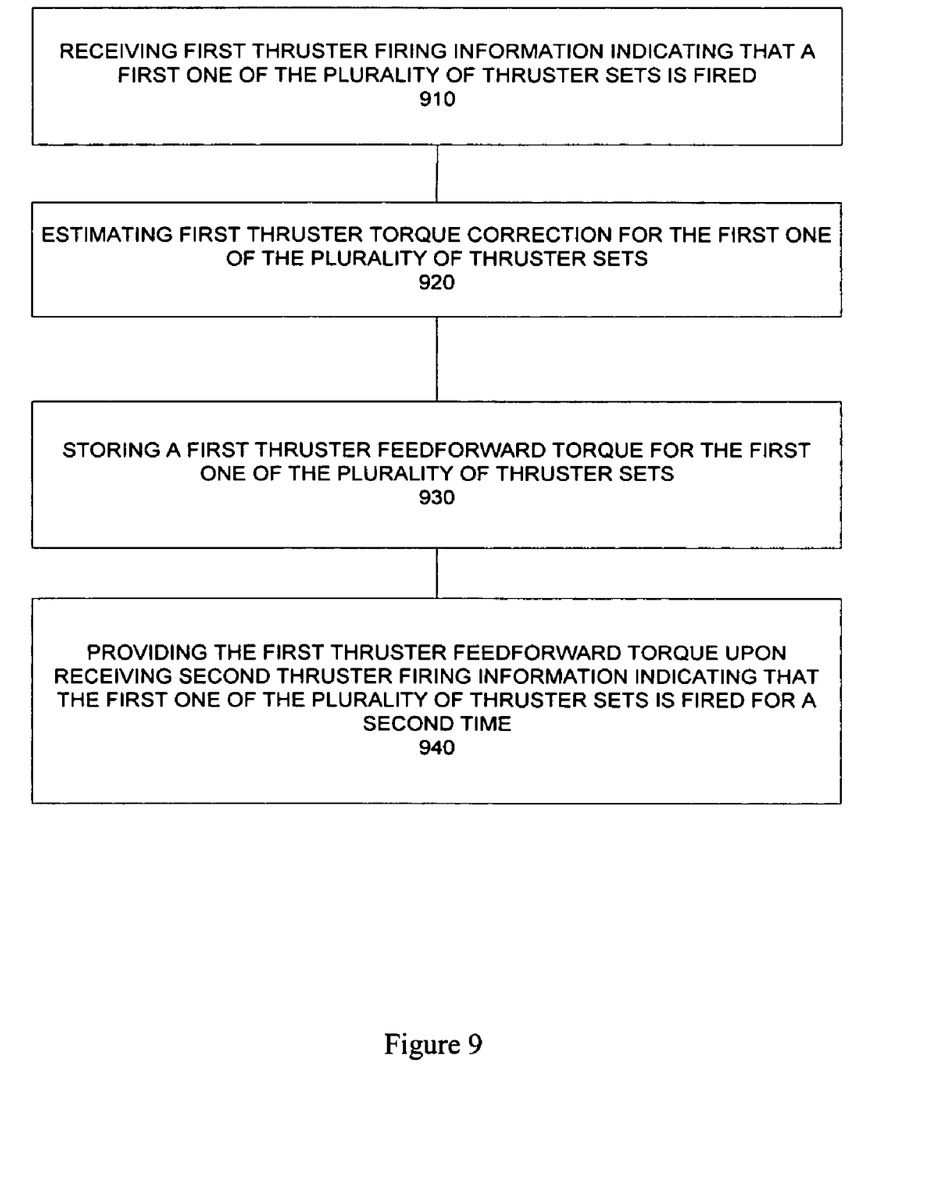
FIG. 9 is a flow chart illustrating an exemplary method for which instructions may be embodied in a machine-readable medium according to one aspect of the present invention.

FIG. 9 is a flow chart illustrating an exemplary method for which instructions may be embodied in a machine-readable medium according to one aspect of the present invention. A machine-readable medium may include instructions for a method for providing torque calibration to a spacecraft. The spacecraft may include multiple thrusters arranged in a plurality of thruster sets. Each of the plurality of thruster sets may include one or more of the thrusters. The method may include the following steps. In step 910, first thruster firing information is received. The first thruster firing information indicates that a first one of the plurality of thruster sets is fired. In step 920, first thruster torque correction is estimated for the first one of the plurality of thruster sets. In step 930, a first thruster feedforward torque is stored for the first one of the plurality of thruster sets based on the first thruster torque correction. In step 940, the first thruster feedforward torque is provided upon receiving second thruster firing information indicating that the first one of the plurality of thruster sets is fired for a second time.

The method may further include receiving a first attitude control torque associated with firing of the first one of the plurality of thruster sets, and receiving first momentum of an actuator assembly of the spacecraft associated with firing of the first one of the plurality of thruster sets. The step of estimating includes estimating the first thruster torque correction for the first one of the plurality of thruster sets based on the first thruster firing information, the first attitude control torque, and the first momentum of the actuator assembly.

The method may also include the following: receiving a second attitude control torque associated with firing of the first one of the plurality of thruster sets for the second time; receiving second momentum of the actuator assembly associated with firing of the first one of the plurality of thruster sets for the second time; estimating second thruster torque correction for the first one of the plurality of thruster sets based on the second thruster firing information, the second attitude control torque, and the second momentum of the actuator assembly; storing a second thruster feedforward torque for the first one of the plurality of thruster sets based on the second thruster torque correction; and providing the second thruster feedforward torque upon receiving third thruster firing information indicating that the first one of the plurality of thruster sets is fired for a third time. The second thruster feedforward torque is more accurate for torque calibration than the first thruster feedforward torque.

The method may also include selecting the first one of the plurality of thruster sets prior to the step of receiving the first thruster firing information. The step of estimating may occur upon receiving the first thruster firing information. When firing of the first one of the plurality of thruster sets is completed or when a different one of the plurality of thruster sets is fired, the step of storing may occur and the step of estimating may be re-initialized at that time. In addition, the second thruster firing information is received after receiving the first thruster firing information.

According to one aspect of the present invention, the computing system 800, or a portion thereof, may be used to store or execute the instructions for the method described above. For example, the memory 806 may store the instructions, and the processor 804 may execute the instructions. One or more processors in a multi-processing arrangement may also be employed to execute the instructions contained in the memory 806. Alternatively, hard-wired circuitry may be used in place of or in combination with software instructions. Thus, the present invention is not limited to any specific combination of hardware circuitry and/or software.

The description of the invention is provided to enable any person skilled in the art to practice the various arrangements described herein. While the present invention has been particularly described with reference to the various figures and configurations, it should be understood that these are for illustration purposes only and should not be taken as limiting the scope of the invention.

There may be many other ways to implement the invention. For example, in one aspect, the present invention may be practiced with a single thruster rather than multiple thrusters.

Various functions and elements described herein may be partitioned differently from those shown without departing from the scope of the invention. Various modifications to these configurations will be readily apparent to those skilled in the art, and generic principles defined herein may be applied to other configurations. Thus, many changes and modifications may be made to the invention, by one having ordinary skill in the art, without departing from the scope of the invention.

Unless specifically stated otherwise, the term "some" refers to one or more. A reference to an element in the singular is not intended to mean "one and only one" unless specifically stated, but rather "one or more." By way of example, and not by way of limitation, each of the thruster torque correction 113, the thruster feedforward torque 115, the actuator torque command 178, the thruster firing information 127, the thruster on-time command 123, the thruster fire command 125, the thruster torque 145, the actuator torque 185, the spacecraft attitude 155, the momentum 187, the attitude error 165, the attitude control torque 175, an attitude, an error, a torque, or an estimate may refer to a plurality of the respective element according to one aspect of the present invention (e.g., the actuator torque command 178 may refer to a plurality of actuator torque commands), may refer to a single respective element according to another aspect (e.g., the actuator torque command 178 may refer to a single actuator torque command), or may refer to one or more of the respective element according to yet another aspect (e.g., the actuator torque command 178 may refer to one or more actuator torque commands).

In addition, by way of example, and not by way of limitation, each of the torque calibration system 110, the thruster torque error estimator 112, the thruster torque archive 114, the thruster firing logic 120, the thruster maneuver logic 122, the thruster command logic 124, the thrusters 140, the actuator assembly 180, the spacecraft, the attitude control system 160, the attitude sensor 163, and the attitude control logic 170 may refer to a plurality of the respective element according to one aspect of the present invention, may refer to a single respective element according to another aspect, or may refer to one or more of the respective element according to yet another aspect. It should be understood that a plurality of elements disclosed or claimed may be practiced using a single element, and such alternative arrangement is within the scope of the claims. By way of example, and not by way of limitation, a plurality of thrusters may be practiced using a single thruster according to one aspect and is within the scope of the claims.

All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description. No claim element is to be construed under the provisions of 35 U.S.C. §112, sixth paragraph, unless the element is expressly recited using the phrase "means for" or, in the case of a method claim, the element is recited using the phrase "step for."

It is understood that the specific order or hierarchy of steps in the processes disclosed is an illustration of exemplary approaches. Based upon design preferences, it is understood that the specific order or hierarchy of steps in the processes may be rearranged. Any accompanying method claims present elements of the various steps in a sample order, which may or may not occur sequentially, and are not meant to be limited to the specific order or hierarchy presented.

What is claimed is:

1. A torque calibration system for a spacecraft, the torque calibration system comprising:
   a thruster torque error estimator configured to receive thruster firing information and an attitude control torque and to provide thruster torque correction; and
   a thruster torque archive configured to receive thruster firing information and thruster torque correction, to store a thruster feedforward torque based on thruster torque correction, to select a thruster feedforward torque stored in the thruster torque archive based on thruster firing information, and to provide the selected thruster feedforward torque to apply torque to the spacecraft.

2. The torque calibration system of claim 1, wherein the thruster torque error estimator is further configured to filter out effects of attitude transients and noise, and a thruster feedforward torque represents a steady-state condition or is a constant.

3. The torque calibration system of claim 1, wherein the thruster torque error estimator is further configured to receive momentum of an actuator assembly of the spacecraft and to provide thruster torque correction based on the thruster firing information, the attitude control torque, and the momentum of the actuator assembly.

4. The torque calibration system of claim 1, wherein the spacecraft comprises a plurality of thrusters and an actuator assembly,
   each of a plurality of thruster sets comprises one or more of the plurality of thrusters,
   the plurality of thrusters is configured to provide thruster torques to the spacecraft, and
   the actuator assembly is configured to provide actuator torques to the spacecraft and to provide momentum of the actuator assembly.

5. The torque calibration system of claim 4, wherein the thruster torque error estimator is further configured to receive first thruster firing information indicating that a first one of the plurality of thruster sets is fired,
   the thruster torque error estimator is further configured to estimate first thruster torque correction associated with firing of the first one of the plurality of thruster sets, and
   the thruster torque archive is further configured to determine a first thruster feedforward torque based on the first thruster torque correction, to store the first thruster feedforward torque, and to provide the first thruster feedforward torque upon receiving second thruster firing information indicating that the first one of the plurality of thruster sets is fired for a second time subsequent to receiving the first thruster firing information.

6. The torque calibration system of claim 5, wherein the thruster torque error estimator is further configured to receive the second thruster firing information indicating that the first one of the plurality of thruster sets is fired for the second time,
   the thruster torque error estimator is further configured to estimate second thruster torque correction associated with firing of the first one of the plurality of thruster sets for the second time, and
   the thruster torque archive is further configured to determine a second thruster feedforward torque based on the first thruster feedforward torque and the second thruster torque correction, to store the second thruster feedforward torque, the second thruster feedforward torque updating the thruster torque archive so that a more accurate thruster feedforward torque is available when the first one of the plurality of thruster sets is fired again, and to provide the second thruster feedforward torque upon receiving third thruster firing information indicating that the first one of the plurality of thruster sets is fired for a third time subsequent to receiving the second thruster firing information.

7. The torque calibration system of claim 1, wherein the spacecraft comprises a plurality of thrusters, each of a plurality of thruster sets comprises one or more of the plurality of thrusters, and the thruster torque archive is further configured to provide a thruster feedforward torque that is zero when any of the plurality of thruster sets is fired for a first time.

8. The torque calibration system of claim 1, wherein the torque calibration system functions autonomously during spacecraft maneuvers.

9. The torque calibration system of claim 1, wherein the thruster torque archive is configured to update a thruster feedforward torque as follows:

a thruster feedforward torque at the end of a present firing segment of a selected thruster set is equal to a gain*thruster torque correction+a thruster feedforward torque obtained from a last firing segment of the selected thruster set.

* * * * *